A. KRAFFT.
DIRECT MACERATING AND JUICE STRAINING SYSTEM.
APPLICATION FILED APR. 15, 1919.

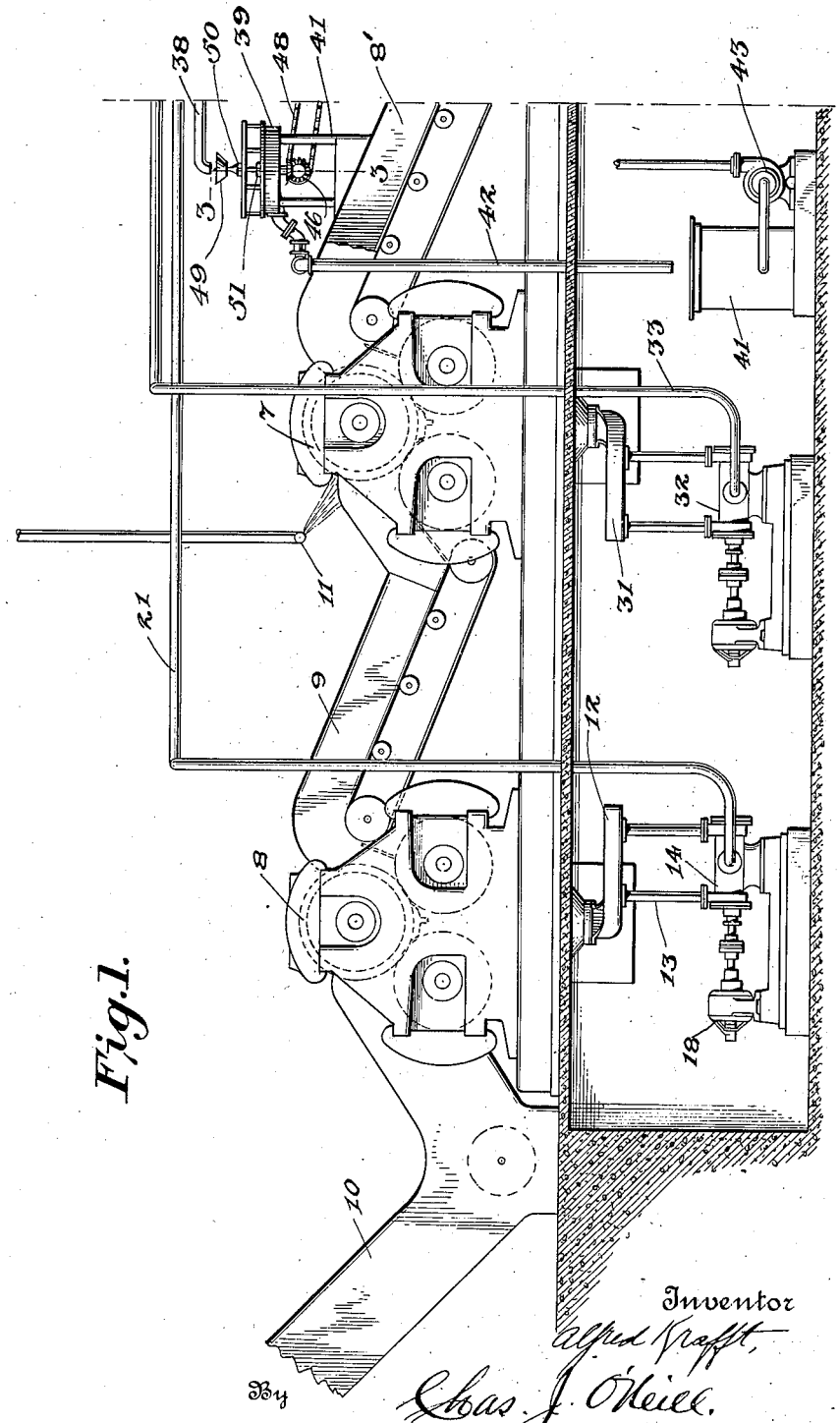

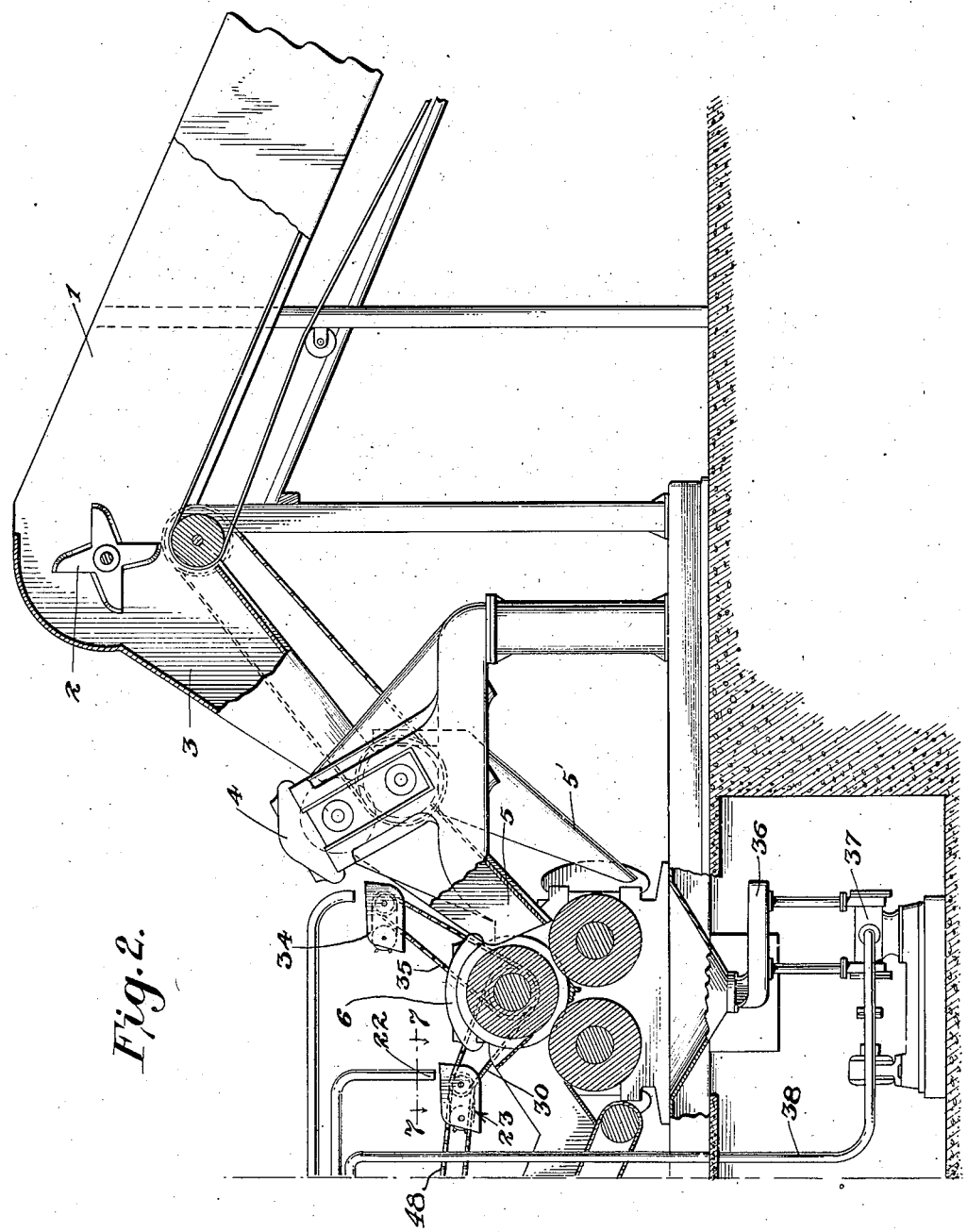

1,353,349.

Patented Sept. 21, 1920.
5 SHEETS—SHEET 3.

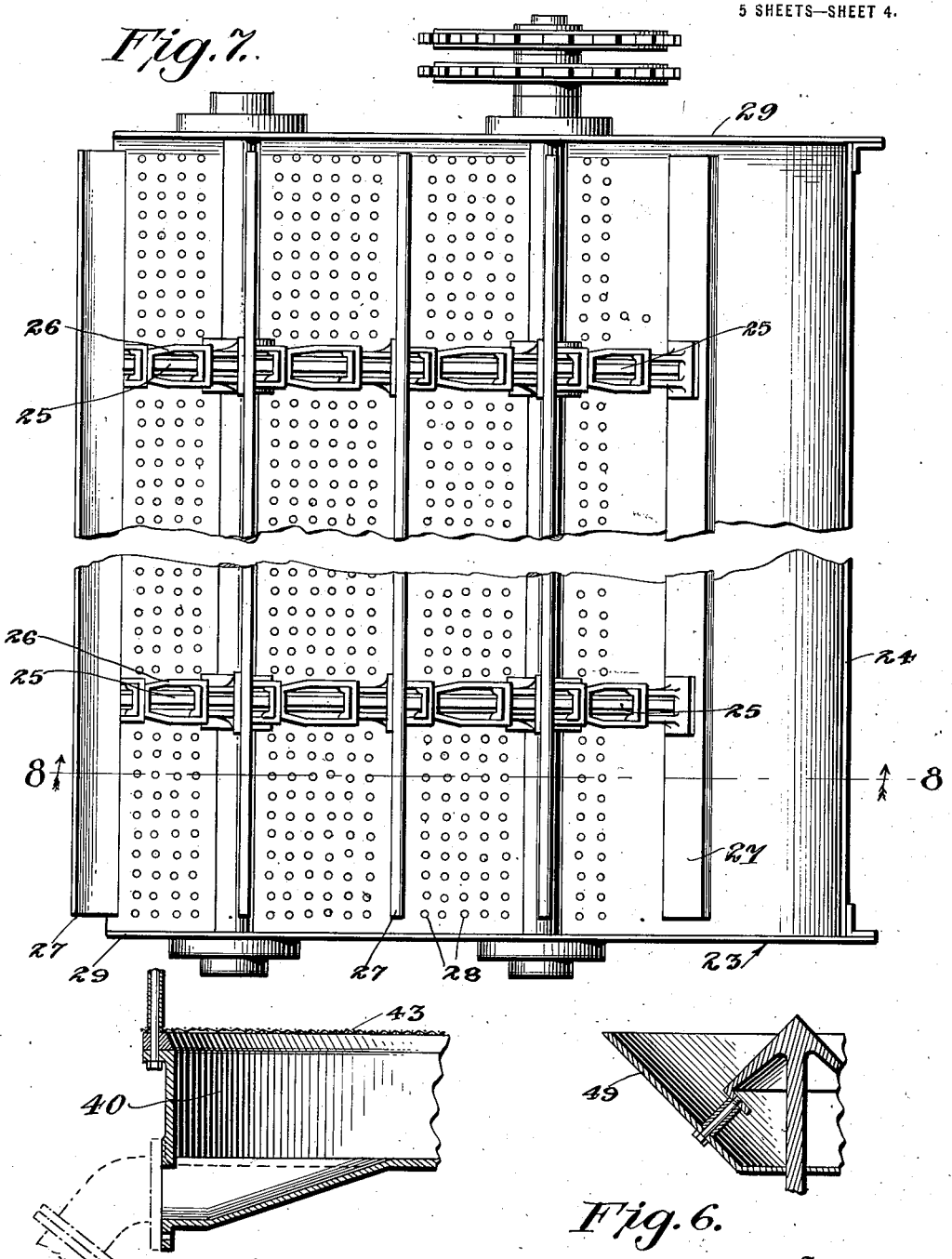

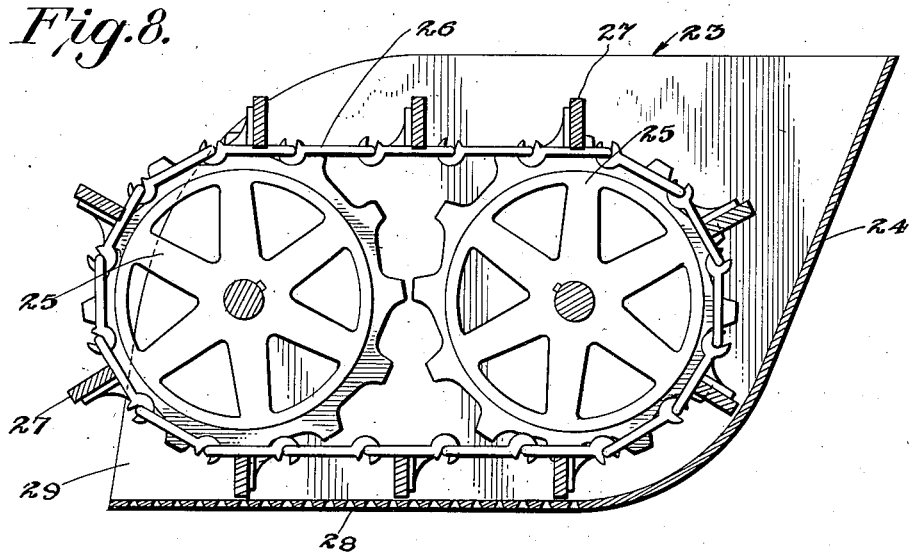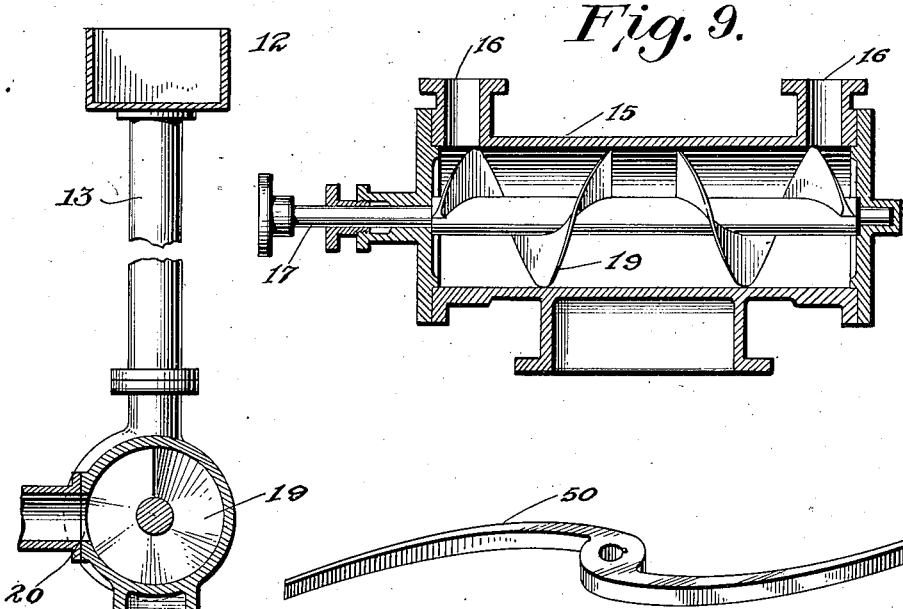

UNITED STATES PATENT OFFICE.

ALFRED KRAFFT, OF HONOLULU, TERRITORY OF HAWAII.

DIRECT MACERATING AND JUICE-STRAINING SYSTEM.

1,353,349. Specification of Letters Patent. Patented Sept. 21, 1920.

Application filed April 15, 1919. Serial No. 290,348.

*To all whom it may concern:*

Be it known that I, ALFRED KRAFFT, a subject of the King of Great Britain, residing at Honolulu, in the county of Oahu, in the Territory of Hawaii, have invented certain new and useful Improvements in Direct Macerating and Juice-Straining Systems; and I do hereby declare the following to be a full, clear, and exact description of the invention, such as will enable others skilled in the art to which it appertains to make and use the same.

This invention relates to a direct macerating and juice straining system.

The primary object of the invention resides in the provision of an apparatus wherein the juice is carried back from one mill to a preceding mill for maceration purposes without being first screened or strained to separate the cush-cush therefrom.

Another object of the present invention resides in the provision of a system, which will be economical in the points of time, space, and operating expense, and one wherein maximum efficiency will result. This object is obtained by the conducting of the juice from the mills to the strainer in a novel manner, and the arrangement and construction of a strainer which will operate to the maximum efficiency. Furthermore, this object is attained by so constructing and placing the strainer that its cleaning will not be necessary, except at great intervals, and when such cleaning is necessary, it may be done in the minimum time.

It is a further object of the invention to so construct the system that the cush-cush or trash will not be permitted to collect in any part of the system, but will, on the other hand, be kept in motion. This will result in the elimination of the usual souring of the juices and the consequent depreciation in the amount of sugar produced.

In the drawings:

Figure 1 is an elevational view of a portion of the system;

Fig. 2 is a similar view, with parts thereof in section, this figure being a continuation of Fig. 1;

Figure 4:
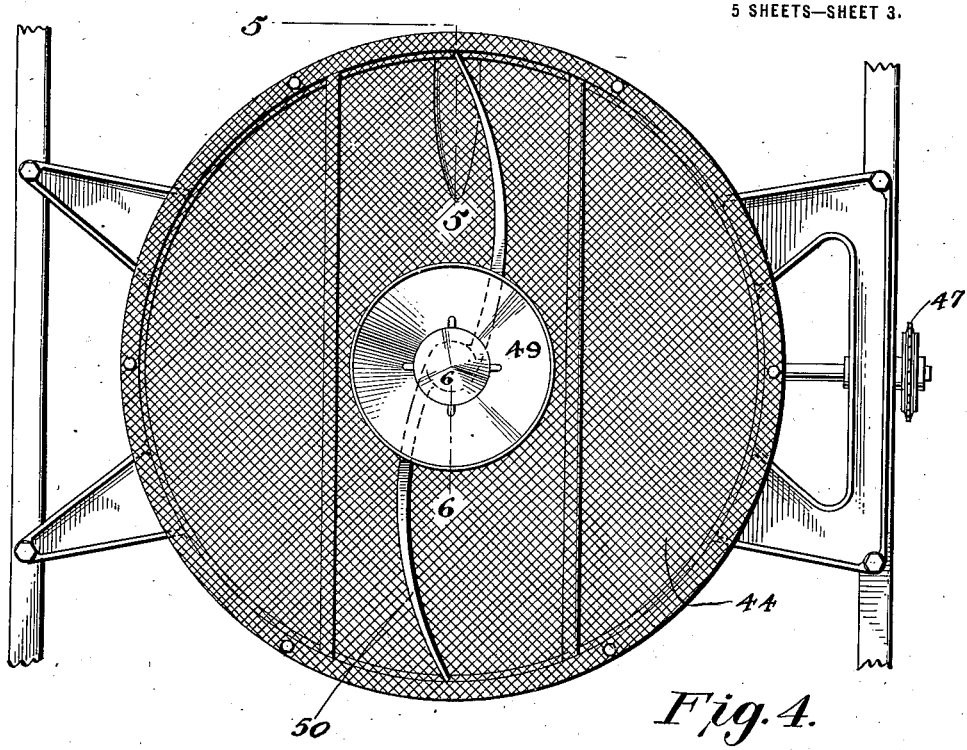
Fig. 4 is a plan view of the same.
Figure 3:
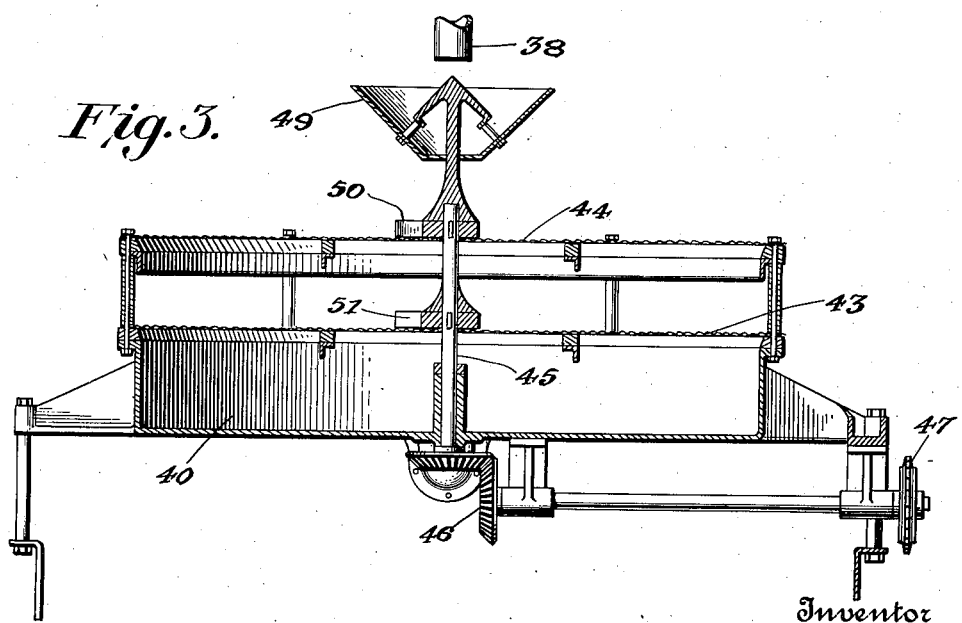
Fig. 3 is a sectional view of the strainer.

Figs. 5 and 6 are details of portions of the strainer on lines 5—5 and 6—6 of Fig. 4;

Fig. 7 is a section on line 7—7 of Fig. 2;

Fig. 8 is a section on line 8—8 of Fig. 7;

Fig. 9 is a vertical section of a pump;

Fig. 10 is a similar view taken at right angles to Fig. 9; and

Fig. 11 is a detail perspective view of a portion of the strainer.

I have illustrated in the drawing a system which includes three mills, but it is to be understood that this system will operate successfully irrespective of the number of mills. I will, however, describe the construction and operation in connection with three mills, for the sake of convenience.

The system includes a carrier 1, which feeds the sugar cane to a series of knives 2. These knives cut the cane into small pieces in the usual manner and the cane is then fed through a raceway 3 to the crusher 4, which is of any desirable form and which is not here illustrated in detail, since its detail construction does not affect the operation of my system. The crushed cane and juice resulting from the crushing operation, passes through a chute 5 to the first mill 6 of the train at the intake side thereof, that is to say between the upper feed rolls. Extending from the first mill 6 to the succeeding mill 7 is a cane carrier 8' of the usual type, and extending from the second mill 7 to the third mill 8, is a similar carrier 9. It is, of course, to be understood that this arrangement of connecting the mills is followed out where more than three mills are used. The bagasse elevator 10 extends from the last mill 8 of the series. A sprayer 11 is arranged above the next to the last mill 7 and is adapted to discharge maceration water onto the cane as it passes from the mill to the next succeeding mill. A trough 12 extends beneath the last mill 8 of the train and is adapted to convey the juice to pipes 13. These pipes connect with a pump 14. This pump as illustrated in Fig. 9, includes a casing 15 having openings 16 at each end thereof with which the pipes 13 communicate, and having a shaft 17, which is driven by a suitable motive force 18, extending axially of the casing. On the shaft 17 two oppositely extending helical flanges 19 are located, which are adapted to draw the juice in through the pipes 13 and the openings 16 and force the same through a common opening 20, which is located between the ends of the casing 15 or between the openings 16. With the use of this pump it is obvious that the necessity for valves and similar devices is eliminated. It is to be understood, however, that the particular form of the pump is not essential to the success of the system, inasmuch as various other forms may be used where open runners are provided. In other words, the essential requirement is that the pump is of such form that the cush-cush laden juice will pass therethrough without causing the pump to clog. A pipe 21 extends from the discharge opening 20 of the pump 14 and terminates at 22 above the discharge side of the first mill 6. The discharge end of this pipe is located above a distributer 23. This distributer includes a trough 24 in which sprockets 25 are located. On these sprockets endless chains 26 are adapted to operate. Extending between and secured to these chains 26 are slats 27, which are adapted to force the juice through perforations 28 in the bottom of trough 24 and the cush-cush from the open end 29 of the trough. These sprockets are operated by a suitable drive chain 30, which extends from the upper roll of the adjacent mill. A trough 31 supplies a pump 32, of a construction similar to the pump 14, with juice from next to the last mill of the train, and this juice is forced by the pump 32 through a pipe 33 to a distributer 34, of a construction similar to that of the distributer 23, previously described. This distributer 34 is operated by a drive chain 35 from the adjacent roll of the mill 6. A trough 36 extends from beneath the first mill 6 of the train to a pump 37, which pump is likewise similar to the pump 14 and from this pump a pipe 38 extends to and terminates above a strainer 39.

The strainer 39 which is illustrated in detail in Figs. 3, 4, 5, 6 and 11 of the drawing, includes a bowl 40, which is supported on suitable standards 41 at a point above the conveyor 8', which discharges into the mill 7, or into the next to the last mill of the series. Communication between this bowl 40 and mill juice tank 41 is established through a pipe 42 and thus the juice which passes from the strainer is conducted to the tank and from the tank to the clarification house by a suitable pump 43. Arranged above the open upper side of the bowl 40 is a screen 43, and a second screen 44 of similar construction is arranged above the screen 43. In fact the number of screens may be increased at the option of the operator. A vertical drive shaft 45 extends upwardly through the bowl 40 and the screens 43 and 44, and is rotated by suitable gearing 46 which receives its motion through a sprocket 47 and a chain 48, which latter extends to the adjacent distributer 23. Keyed to the upper end of the shaft 45 is a juice receiver 49, into which the juice from the pipe 38 is discharged. This receiver 49 when rotated with the shaft 45 and when supplied with juice, evenly distributes the juice and cush-cush, which accompanies the juice, over the surface of the uppermost screen 44, continuously. Keyed to the shaft 45 below the receiver 49 is a spider 50 which revolves with the shaft 45, and gradually works the cush-cush to the outer edge of the screen 44 while permitting the juice to pass through the screen. A second spider 51 is arranged above the lowermost screen 43 and performs the same function in connection with that cush-cush which naturally passes through the upper screen. As before stated, the number of screens may be increased in order to insure that the juice which finally reaches the bowl 40 will be free of cush-cush.

In operation the cane is fed through the carrier 1 to the knives 2 where it is cut into small pieces, and thence to the crusher 4. The cane thus crushed passes through the trough 5 to the first mill 6 of the series, while the juice from the crusher passes through the raceway 5' to the trough 36 which is arranged beneath the first mill 6. The cane from the mill 6 is carried successively to the mills 7 and 8, or where more mills are used, to and through all of the mills of the series, and the bagasse is finally discharged by the elevator 10. As the juice is expressed from the cane by each of the mills it is caught by the trough which is arranged beneath the mill, and carried to the associate pump. The juice from the last mill 8 of the series, which juice has received the maceration water, from the sprayer 11, is forced by the pump 14 to the distributer 23. This juice carries with it a considerable quantity of cush-cush. The distributer 23 forces the juice through the perforations 28 and the cush-cush from the open ends 29 of the trough 24. This juice and cush-cush drop upon the cane, which has been acted upon by the first mill of the series, and this cane passes from the mill to the succeeding mill. The juice from the next to the last mill of the series is forced by the pump 32 to the distributer 34 and the cush-cush and juice are evenly spread over the cane before it enters the first mill 6 of the series and after it passes from the crusher 4. The juice from the first mill 6 of the series is forced by the pump 37 through the pipe 38 to the screen 39. It will be understood that this juice includes all of the juice which passes from the several mills and from the crusher. After the cush-cush is separated from the juice by the strainer 39 and the cush-cush has been deposited on the cane before it enters the next to the last mill of the series, the juice passes to the receiving tank 41 and is thence forced to the clarification house. The juice which is forced to the clarification house is free of cush-cush and yet the maximum amount of juice has been expressed from the cane.

As a broad proposition, the juice which is expressed from the cane by one mill is carried back, together with the cush-cush contained therein, to and deposited on the matte which is discharged from a preceding mill and therefore acts to macerate the cane before it enters the first mentioned mill.

I have constructed the system so that the juice will be entirely freed of cush-cush before it is pumped to the clarification house and wherein accumulation of cush-cush and the consequent souring of the juice is prevented. Furthermore, I have so constructed the strainer that there will be no likelihood of its being broken by foreign matter which enters the same with the cush-cush and juice. Furthermore, the cleaning of the strainer is very simple because of its construction and may be done in the minimum time. This system obviates the necessity for screening the juice as it leaves each mill before it can be used for maceration purposes and consequently the maceration is more successful and the great disadvantage of using the usual long screen which receives the juice from all of the mills is done away with.

While I have described the system as including three mills, it is, of course, to be understood that the number of mills may be increased. For instance, if a four-mill train is used, the juice and cush-cush from the last or fourth mill is discharged in front of the preceding or third mill; the juice and cush-cush from the third and second mills is discharged in front of the first mill and the juice and cush-cush from the first mill is discharged upon the strainer in front of the second mill.

What I claim is:—

1. In a system of the class described, the combination with a train of mills, of means for conducting the cush-cush laden juice from succeeding mills to the intake and discharge sides of a preceding mill, means for conducting the juice from the last mentioned mill, and a juice strainer interpolated in said means and arranged to discharge the solid matter into the cane leaving one of the mills.

2. In a system of the class described, the combination with a train of mills, of means for applying maceration water to the cane as it leaves the next to the last mill of the train, means for forcing the cush-cush laden juice from the last mill to the discharge side of the first mill, means for forcing the juice from next to the last mill to the intake side of the first mill, and means for conducting the juice from the first mill.

3. In a system of the class described, the combination with a train of mills, of a pump for forcing the cush-cush laden juice from the last mill of the train to the discharge side of the first mill, a pump for forcing the cush-cush laden juice from the next to last mill of the train to the intake side of the first mill, a straining device arranged in advance of one of the mills, and a pump for forcing the juice to the straining device from the first mill.

4. In a system of the class described, the combination with a train of mills, of means for conducting the cush-cush laden juice to the first mill from one of the remaining mills of the train, means for distributing the juice over the cane as it leaves the first mill, means for collecting the juice from the first mill, means for straining the juice, and means for forcing the juice from the first mill to the strainer, the strainer being arranged in advance of one of the mills and adapted to discharge the solid material onto the cane entering said mill.

5. In a system of the class described, the combination with a train of mills, of means for causing the cush-cush laden juice from one of the succeeding mills to pass through the first mill of the train, a strainer consisting of a series of screens and rotary spiders operating over said screens to force the juice through the screens and the solid material from the edges thereof, and means for forcing the juice from the first mill to said straining device.

6. In a system of the class described, the combination with a train of mills, of conveyers extending between the same, a strainer arranged above one of the conveyers, and means to convey the juice from all of the mills to said strainer, said strainer being constructed to discharge the solid matter on the matte of cane of the adjacent conveyer.

7. In a system of the class described, the combination with a train of mills, of conveyers extending between the same, a strainer arranged above one of the conveyers, means for conveying the cush-cush laden juice from one of the succeeding mills to the first mill of the train, and means for forcing the juice from the first mill to the strainer, said last mentioned means including a pump which consists of a casing having continuously open inlet and outlet openings, and a rotary pumping flange.

In testimony whereof I affix my signature.

ALFRED KRAFFT.